United States Patent
Fanning et al.

(10) Patent No.: US 9,135,034 B2
(45) Date of Patent: *Sep. 15, 2015

(54) IMPERATIVE ATTRIBUTION FOR ELEMENTS IN MANAGED RUNTIMES

(75) Inventors: Michael C. Fanning, Redmond, WA (US); Gregory Bernard Miskelly, Seattle, WA (US); Akrosh Gandhi, Redmond, WA (US); Timothy S. Rice, Seattle, WA (US); Tae Hyung Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 357 days.

This patent is subject to a terminal disclaimer.

(21) Appl. No.: 13/586,896

(22) Filed: Aug. 16, 2012

(65) Prior Publication Data

US 2014/0053142 A1  Feb. 20, 2014

(51) Int. Cl.
G06F 9/44 (2006.01)
G06F 9/455 (2006.01)
G06F 11/36 (2006.01)

(52) U.S. Cl.
CPC ........ G06F 9/45504 (2013.01); G06F 11/3612 (2013.01)

(58) Field of Classification Search
CPC .................. G06F 9/45504; G06F 11/3612
USPC ......................................................... 717/130
See application file for complete search history.

(56) References Cited

U.S. PATENT DOCUMENTS

| | | | |
|---|---|---|---|
| 6,164,841 A | 12/2000 | Mattson, Jr. et al. | |
| 6,353,923 B1 | 3/2002 | Bogle et al. | |
| 6,836,884 B1 | 12/2004 | Evans et al. | |
| 7,013,458 B2 | 3/2006 | Bloch et al. | |
| 7,451,432 B2 | 11/2008 | Shukla et al. | |
| 7,716,246 B2* | 5/2010 | Pepin | 707/791 |
| 8,001,539 B2* | 8/2011 | Mitchell | 717/158 |
| 8,291,381 B2* | 10/2012 | Lai et al. | 717/124 |
| 2004/0049766 A1* | 3/2004 | Bloch et al. | 717/121 |
| 2004/0205720 A1 | 10/2004 | Hundt | |
| 2005/0091655 A1 | 4/2005 | Probert et al. | |
| 2007/0124334 A1* | 5/2007 | Pepin | 707/104.1 |

(Continued)

OTHER PUBLICATIONS

Bracha, et al., "Mirrors: Design Principles for Meta-level Facilities of Object-Oriented Programming Languages", Retrieved at <<http://ftp.linux62.org/~glibersat/publis/p331-bracha.pdf>>, Proceedings of OOPSLA '04 Proceedings of the 19th annual ACM SIGPLAN conference on Object-oriented programming, systems, languages, and applications, Oct. 24, 2004, pp. 14.

Ko, et al., "Debugging Reinvented: Asking and Answering Why and Why Not Questions about Program Behavior", Retrieved at <<http://ieeexplore.ieee.org/stamp/stamp.jsp?tp=&arnumber=4814141i>>, Proceedings of ACM/IEEE 30th International Conference on Software Engineering, 2008. ICSE '08, May 10, 2008, pp. 11.

(Continued)

Primary Examiner — Marina Lee
(74) Attorney, Agent, or Firm — Kevin Sullivan; Kate Drakos; Micky Minhas (57) ABSTRACT

Aspects of the subject matter described herein relate to imperative attribution. In aspects, metadata of a managed runtime environment may be set by imperative statements included in code of a program executing in the managed runtime environment. The metadata may be associated with lookup data that identifies the metadata. The lookup data may be formed from an identifier supplied by an imperative statement and an identifier of a logical element which may be explicitly or implicitly supplied. The metadata may be computed at parse time, run time, or another time and may be computed based on state available to a managed runtime environment at the time the metadata is computed.

18 Claims, 5 Drawing Sheets

(56) References Cited

U.S. PATENT DOCUMENTS

| | | | |
|---|---|---|---|
| 2007/0288908 A1* | 12/2007 | Cain et al. | 717/130 |
| 2008/0208888 A1* | 8/2008 | Mitchell | 707/102 |
| 2009/0089764 A1* | 4/2009 | Lai et al. | 717/143 |
| 2009/0254883 A1* | 10/2009 | Munson et al. | 717/124 |
| 2010/0050159 A1 | 2/2010 | Daniel | |
| 2010/0153927 A1 | 6/2010 | Stall et al. | |
| 2010/0235810 A1 | 9/2010 | Campbell et al. | |
| 2011/0138361 A1 | 6/2011 | McEntee et al. | |
| 2011/0296375 A1* | 12/2011 | Mooney | 717/106 |
| 2012/0167056 A1 | 6/2012 | Brunswig et al. | |
| 2012/0311540 A1* | 12/2012 | Fanning et al. | 717/127 |
| 2013/0311973 A1* | 11/2013 | Rice et al. | 717/124 |
| 2014/0053142 A1* | 2/2014 | Fanning et al. | 717/141 |
| 2014/0068544 A1* | 3/2014 | Fanning et al. | 717/100 |

OTHER PUBLICATIONS

Gioachin, et al., "Dynamic High-Level Scripting in Parallel Applications", Retrieved at <<http://ieeexplore.ieee.org/stamp/stamp.jsp?tp=&arnumber=5161040>>, Proceedings of IPDPS 2009. IEEE International Symposium on Parallel & Distributed Processing, 2009, May 23, 2009, pp. 11.

"Injecting Code Dynamically with the Debugging API", Retrieved at <<http://msdn.microsoft.com/en-us/library/bb384380(v=vs.110).aspx>>, Retrieved Date Apr. 10, 2012, pp. 5.

Timothy, et al., "Assisting Development Tools Through Inserted Code Statements", U.S. Appl. No. 13/473,614, filed May 17, 2012, pp. 46.

* cited by examiner

IMPERATIVE ATTRIBUTION FOR ELEMENTS IN MANAGED RUNTIMES

BACKGROUND

As software (and its development) has grown increasingly complex, there has been a trend towards augmenting the literal application source code of programs with additional supporting information, often referred to as "metadata". Program metadata is often consumed by development tools in order to provide a richer tooling experience. For example, metadata may indicate that a function or method may not be made inline. A compiler may use this metadata at compile time to create a binary executable where the function or method indicated by the metadata is not inline. After use, the metadata is discarded and cannot be retrieved on inspecting the compiled binary. The metadata described above can only include what is known or can be calculated at compile time.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to imperative attribution. In aspects, metadata of a managed runtime environment may be set by imperative statements included in code of a program executing in the managed runtime environment. The metadata may be associated with lookup data that identifies the metadata. The lookup data may be formed from an identifier supplied by an imperative statement and an identifier of a logical element which may be explicitly or implicitly supplied. The metadata may be computed at parse time, run time, or another time and may be computed based on state available to a managed runtime environment at the time the metadata is computed.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Headings are for convenience only; information on a given topic may be found outside the section whose heading indicates that topic.

Other definitions, explicit and implicit, may be included below.

Exemplary Embodiments

Figure 1:
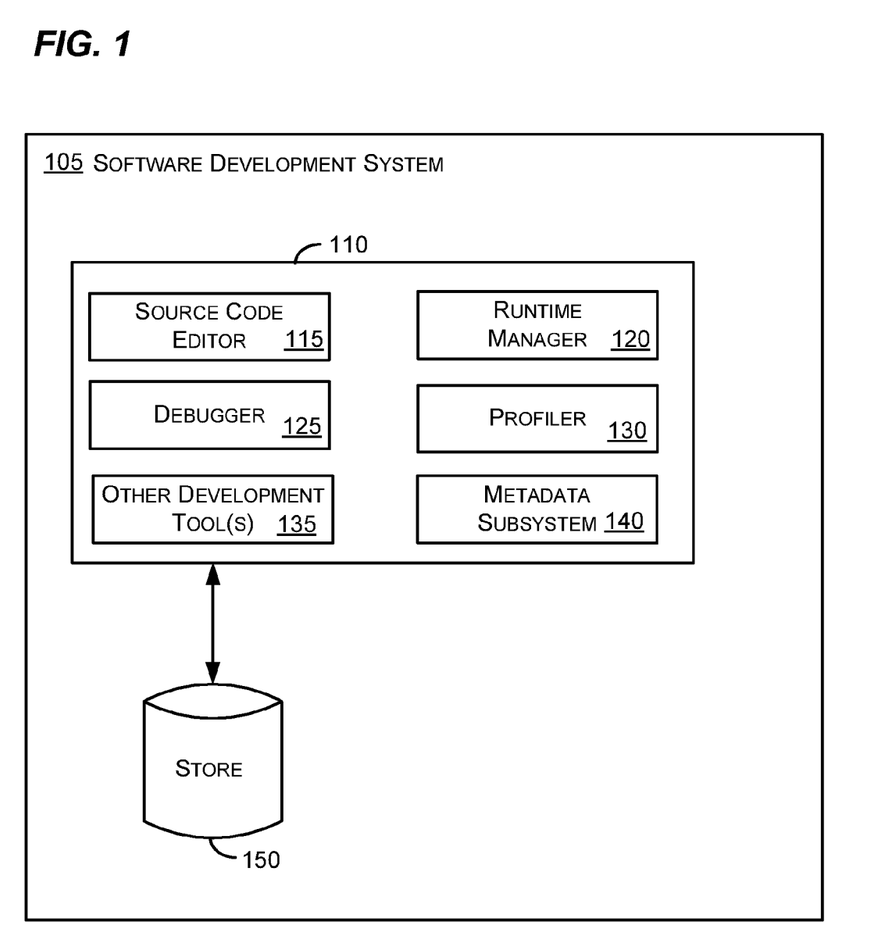
FIG. 1 is an exemplary environment that includes a software development system in accordance with aspects of the subject matter described herein.
Figure 2:
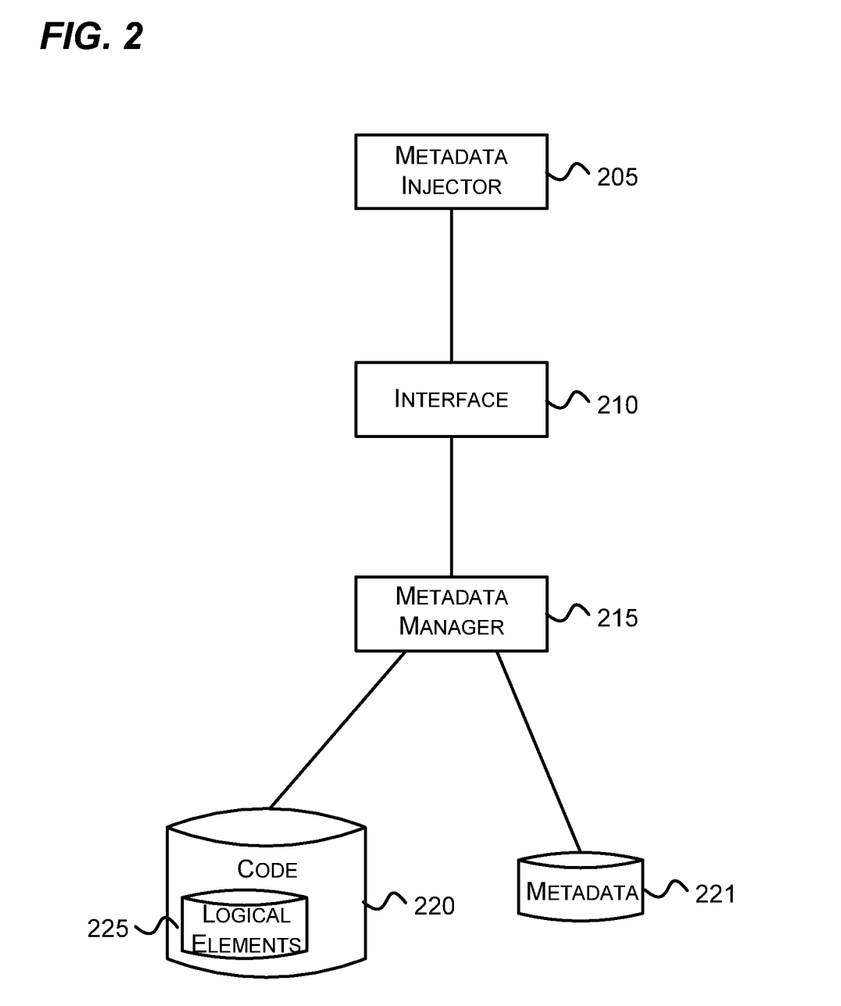
FIG. 2 is a block diagram that illustrates an exemplary metadata subsystem in accordance with aspects of the subject matter described herein.
Figure 3:
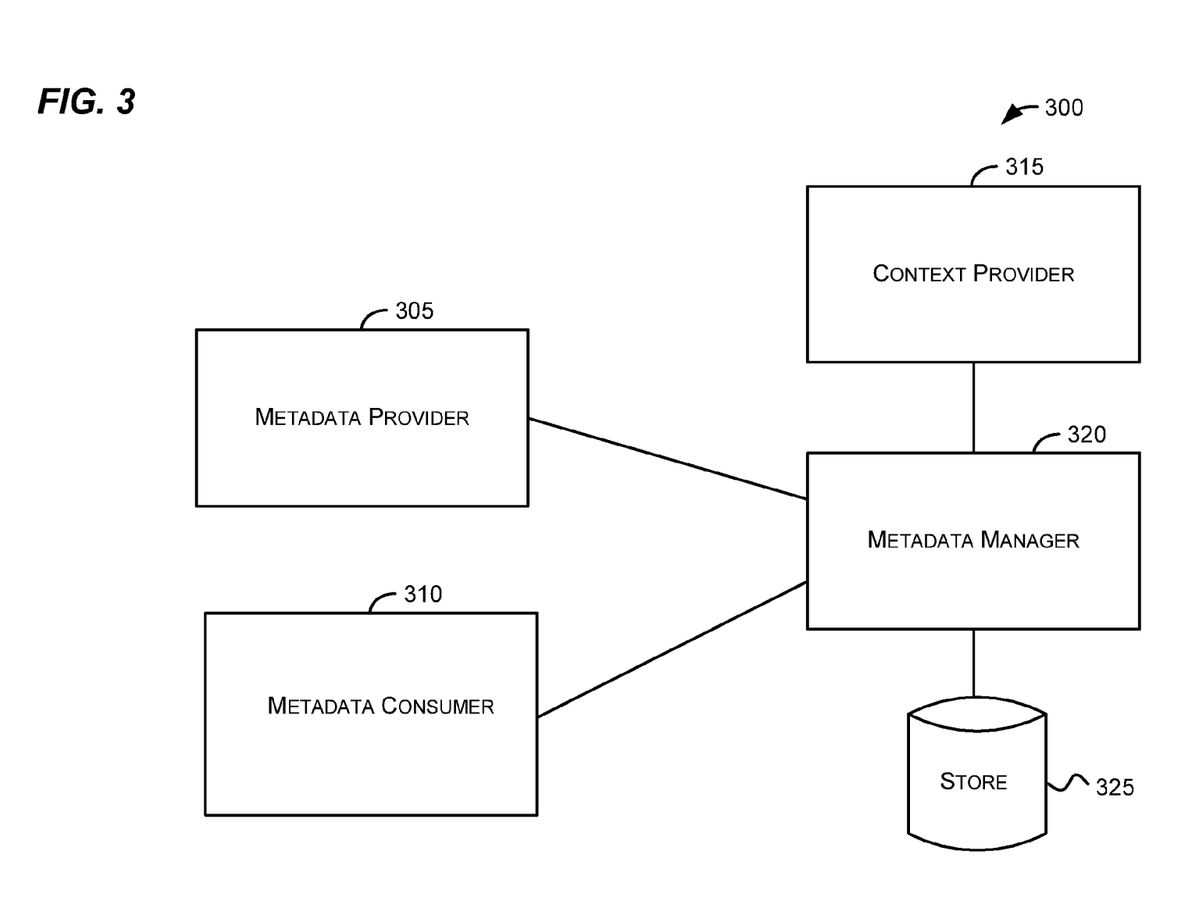
FIG. 3 is a block diagram that illustrates exemplary components that may interact with each other in accordance with aspects of the subject matter described herein.

FIGS. 1-3 are block diagram that represent an exemplary environment in which aspects of the subject matter described herein may operate. The components illustrated in FIGS. 1-3 are exemplary and are not meant to be all-inclusive of components that may be needed or included. In other embodiments, the components and/or functions described in conjunction with FIGS. 1-3 may be included in other components (shown or not shown) or placed in subcomponents without departing from the spirit or scope of aspects of the subject matter described herein. In some embodiments, the components and/or functions described in conjunction with FIGS. 1-3 may be distributed across multiple devices.

One or more of the components illustrated in FIGS. 1-3 may be implemented by one or more computing devices. Computing devices may include one or more personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, hardware capable of executing instructions, distributed computing environments that include any of the above systems or devices, and the like.

One or more of the components illustrated in FIGS. 1-3 may be implemented in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth.

More than one virtual environment may be hosted on a single computer. That is, two or more virtual environments may execute on a single physical computer. To software executing in each virtual environment, the virtual environment appears to have its own resources (e.g., hardware) even though the virtual environments hosted on a single computer may physically share one or more physical devices with each other and with the hosting operating system.

FIG. 1 is an exemplary environment that includes a software development system in accordance with aspects of the subject matter described herein. Turning to FIG. 1, the system 105 may include software development components 110, a store 150, and may include other components (not shown). The software development components may include a source code editor 115, a runtime manager 120, a debugger 125, a profiler 130, other development tool(s) 135, a metadata subsystem 140, and other components (not shown). As used herein, the term component is to be read to include all or a portion of one or more devices, a collection of one or more software modules or portions thereof, some combination of one or more software modules or portions thereof and one or more devices or portions thereof, and the like.

The store 150 may include any storage media capable of storing data involved with software development. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 150 may be implemented as a file system, database, volatile memory such as RAM, other storage, some combination of the above, and the like and may be distributed across multiple devices. The store 150 may be external, internal, or include components that are both internal and external to the devices that host components of the software development system 105.

In one embodiment, the software development components 110 may be operable to work with a dynamic programming language. In another embodiment, techniques that are described herein may also be applied to non-dynamic programming language environments.

At runtime, a dynamic programming language environment may perform some actions a non-dynamic programming language environment performs at or before compile time, if at all. For example, during program execution, a dynamic programming language environment may add new code, extend objects and definitions, modify a type system, and the like. Some exemplary dynamic programming languages include ACTIONSCRIPT, BASIC, BEANSHELL, CLOJURE, COLDFUSION, LISP, GROOVY, JAVASCRIPT, VBSCRIPT, PERL, PHP, POWERSHELL, PYTHON, RUBY, SMALLTALK, TCL, and the like. Some non-dynamic programming languages include assembly, C, C++, JAVA, PASCAL, FORTRAN, and others.

The source code editor 115 may allow a software developer to enter, delete, and modify source code of a program. The source code editor 115 may display source code of a program on a display and receive input via the user interface.

The runtime manager 120 may launch a runtime environment to execute source code. In one embodiment, a runtime environment may include a Web browser. In other embodiments, a runtime environment may include one or more components that allow code to be executed outside of a Web browser.

The debugger 125 may interact with a runtime environment to test and debug a program. The debugger 125 may allow a software developer to execute a program step-by-step, pause the program at certain points within the program, track values of variables and memory locations, modify program state, and the like. The debugger 125 may allow a software developer to indicate the conditions under which the debugger 125 is notified of exceptions. For example, a software developer may want to be notified of exceptions that are raised in user code but not to be notified of exceptions that are raised in library code.

The profiler 130 may be used to collect statistics regarding execution of a program. For example, the profiler 130 may measure usage of memory, usage of particular instructions, frequency and duration of functions calls, other statistics, and the like. To collect the statistics, the profiler 130 may interact with the runtime environment, may be a part of the runtime environment, may reside in a lower layer that allows the profiler 130 to see what code is executed, or may operate in other ways known to those skilled in the art.

The other development tool(s) 135 represent any other development tools that may be included in the software development system 105.

The metadata subsystem 140 may include one or more components that allow metadata to be associated with logical elements of a program. Metadata may include static data (e.g., the value "5") or dynamic data that is available or computed at parse time, compilation time, run time, or some other time. Metadata may be specified by providing static data, code that when executed produces data, a reference to code that when executed produces data, or the like.

Metadata does not influence the logical flow of the program but may influence the behavior of the environment in which the program executes. For example, metadata may be used by a runtime to determine whether an exception is to be raised to a debugger, but the metadata does not affect results calculated by the program.

As mentioned above, metadata may be associated with logical elements of a program. Some exemplary logical elements include functions, files, code containers, lexical scopes, current stack frames, stack of calling scope, properties, classes, prototypes, worker threads, specific call instances, specific object instances, delegates, global scope, other logical elements, and the like. Furthermore, a logical element may or may not inherit metadata from its parent (e.g., containing or calling logical element) based on a configuration or a parameter passed to an API, for example.

This association of metadata with a logical element may allow a runtime to obtain the metadata based on a logical element and state that is available via the runtime. This association may also allow the calculation of all or a portion of the metadata based on state of the program. The specific logical element to which to associate metadata may be explicitly indicated or inferred.

Metadata may be set via an application programming interface (API). A software developer may cause the API to be called during runtime by adding a programming statement to the source or other code of a program for which metadata is desired. In one implementation, for flexibility, one or more programming statements that call the API may be placed within the source code where any other types of programming statements may be placed. The metadata may indicate data that is immediately available or that may be calculated at runtime. For example, the metadata may be calculated based on inspecting a relevant scope/stack chain.

The API may include required and optional parameters. Zero or more of the parameters may include static data (e.g., data that may be calculated or determined by data included in the parameter) while zero or more of the parameters may be calculated based on runtime state. Below some exemplary types of parameters are described in more detail. The API may allow metadata to be set for one or multiple metadata identifiers. There is no intention, however, that the types described below are all-inclusive or exhaustive of the types that may be used in accordance with the teachings herein. Indeed, based on the teachings herein, those skilled in the art may recognize other types of parameters that may be used without departing from the spirit or scope of aspects of the subject matter described herein. Some exemplary types of parameters include:

1. An identifier to associate with the metadata. For example, an API may include a parameter that allows a caller of the API to indicate an identifier that is to be associated with the metadata. Subsequently, this identifier may be used to obtain the metadata from the metadata subsystem 140.

2. Specific call instance. In some implementations it may be desirable to have metadata associated with a specific invocation of a function. For example, instead of having the metadata associated with every call to the function, it may be desirable to have the metadata associated with a certain call to the function or a set of calls to the function. This may be accomplished through the use of a specific call instance.

In one embodiment, a specific call instance may be identified via a function name and a number or a set of numbers. The number(s) may indicate specific invocation(s) of the function. For example, a function may be called many times during the execution of a program. To identify a specific call, a statement setting metadata may include an identifier of the function and a number corresponding to the specific call.

In another embodiment, metadata associated with a metadata identifier may be collected into a set. Each time a statement is executed to set metadata for the identifier, data may be added to the set that indicates the context (e.g., the scope or other data that identifies the statement that was executed) as well as the payload provided via the statement. This data may later be used to identify metadata for the identifier for a specific call or set of calls.

3. An "applies-to" parameter. The API may include a parameter that indicates the type of logical element with which the metadata is to be associated. This is sometimes referred to herein as the scope to which the metadata may be applied. This parameter together with the scope from which the API is called may be used to determine a logical element with which to associate the metadata. For example, if the API is called from the scope of a block within a function and the parameter indicates the logical element of the metadata is a function, the metadata may be associated with the function (not the block).

As another example if the parameter indicates that the metadata is to be applied to a function, but the API is called from a global scope, the call may be ignored, an error may be generated, or the metadata may be stored with information that indicates that the API was called from a global scope.

An "applies-to" parameter may also be used by the runtime to tune the runtime's behavior. For example, an applies-to parameter that indicates that the metadata is global may be used by the runtime to create a global variable that is modified each time the metadata is changed. As another example, an applies-to parameter that indicates that the metadata is for a function may be used by the runtime to remove the executable code (e.g., from compiled code created at runtime) that calls the API after the API has been called once from the function.

An applies-to parameter may be inferred by the logical element from which the API is called. For example, if the API is called from a global scope, the metadata may be associated with a global scope. If the API is called from a function, the metadata may be associated with the function scope. If the API is called from within a lexical scope, the metadata may be associated with the lexical scope.

4. An identifier of a logical element. The API may include a parameter that indicates a specific logical element with which to associate the metadata. For example, the API may allow a caller to indicate a function other than the function from which the API is called.

Where a logical element is not explicitly indicated, the logical element may be inferred. For example, a logical element may be inferred to be a scope (e.g., function, block, file, or the like) that includes the call to the API.

5. A disabling parameter. The API may include a parameter that indicates how many times a statement may be used to call the API. For example, in some cases it may be desirable to have a statement to set metadata only call the API once. For example, it may be useful to know whether a function has ever been called during the execution of a program. In another embodiment, it may be useful to know whether a loop has been executed once. In one implementation, to improve performance, a runtime may remove the executable code (e.g., from compiled code created at runtime or at compile time)

that calls the API after the API has been called the specified number of times from the desired scope.

Other techniques may be used to remove or otherwise disable an instruction that sets the metadata. Some examples of such techniques include providing a callback with the metadata where the callback indicates whether the instruction is to be removed or otherwise disabled, setting a property, and the like. Another example includes calling an API, providing a metadata identifier, and indicating that the instruction is to be removed or otherwise disabled, or the like. The above examples are not intended to be all-inclusive or exhaustive. Indeed, based on the teachings herein, those skilled in the art may recognize other techniques that may be used to remove or otherwise disable an instruction that sets metadata without departing from the spirit or scope of aspects of the subject matter described herein.

6. A recursion parameter. The API may include a parameter that how the metadata is to be applied when recursion occurs. This parameter may indicate that the metadata may be associated with a specific level of the recursion so that a metadata consumer may obtain the least recent, most recent, or some other time at which the metadata was set during the recursion.

7. A relationships parameter. The API may allow a parameter that indicates a relationship of the call to other current stack frames in order to identify a logical element. Some examples of relationships parameters include first setter wins, last setter wins, set metadata and ignore all subsequent setters in nested frames, set metadata for the current frame only, and the like. In first setter wins, the metadata set by the first stack frame to set the metadata is retained while other metadata that is attempted to be set by later stack frames is discarded or ignored. In last setter wins, the metadata set by the last stack frame to set the metadata is retained while other metadata that is attempted to be set by later stack frames is discarded or ignored.

In set metadata and ignore all subsequent setters in nested frames, the metadata set by an outer frame is retained while the other metadata that is attempted to be set by stack frames within the outer frame is discarded or ignored. In set metadata for the current frame only, if the metadata is set in another frame(s), a separate value for each frame is retained (instead of overwriting or discarding values).

8. A callback parameter. In one embodiment, one or more callback functions may be provided as parameters to the API. For example, a statement such as:
SetAttribute("Identifier", GenValue);
may be inserted into code by a developer. The callback function GenValue may be called by the runtime to provide metadata. The callback function may use runtime state to compute the metadata.

In this embodiment, calculation of the metadata may be deferred to a time after the statement is encountered in the code. For example, the runtime may lazily wait to call the GenValue function until the runtime needs the metadata.

9. Phase. In one embodiment, the API may include a parameter that indicates when the metadata setting statement is to be evaluated. For example, the parameter may indicate that the metadata setting statement is to be evaluated during first parse, second parse, or Nth parse, during execution, during first compilation or re-compilation, or during some other phase.

10. Payload. The API may include a parameter that indicates the metadata. The payload parameter may include metadata or may include or reference instructions (e.g., programming statements) for creating the metadata using program state that is available during execution of the program. For example, a payload may include the actual metadata, code that when executed generates the metadata, or a callback (e.g., a reference to code) that when called generates the metadata.

Some exemplary examples of types of calls to the API include:

1. SetAttribute("foo", . . . ). In this example, the API is called with an explicit static identifier "foo" and zero or more other parameters (indicated by the . . . ).

2. SetAttribute(objfoo, . . . ). In this example, the API may combine data that could be specified by separate parameters by allowing information about the metadata to be specified in an object with properties. For example, an object (e.g., objfoo) may have an identifier property, and one or more of a scope property, an applies-to property, and other properties. One example of this is illustrated by the following code snippet:

```
SetCustomAttribute(
{   "name":"foo",
    "appliesTo":"Function"}, payload);
```

In this example, an object includes two properties. The name property specifies an identifier of the metadata while the appliesTo property indicates the logical elements the metadata may be applied to. Furthermore, one or more of the properties may be computed based on state that exists during execution.

3. SetAttribute(foo( ), . . . ). In this example, a reference to a function is passed as a parameter to the API. This function may include statements that return or calculate data used by the API. In one embodiment, the function may be called when the metadata is requested by a metadata consumer. In another embodiment, the function may be called immediately and the return data stored in a metadata store. In another embodiment, the function may be called at one or more other times.

4. SetAttribute("http://ms.keys/foo", . . . ). In this example, a reference to a location accessible via a network is passed as a parameter to the API. In one example, the location may be a place to store the metadata. In another example, the location may indicate a service that may be called to store the metadata.

The metadata subsystem 140 may maintain information about the scope from which the API is called. For example, the API may be called from various nested scopes (e.g., where one logical element is within another logical element). For example, a function Bar may have nested logical elements such as:

```
Bar( )
{
    SetAttribute("foo", payload1);
    {
        SetAttribute("foo", payload2);
        Bar2( )
        {
            SetAttribute("foo", payload3);
        }
    }
}
```

In this example, the API may store the identifier (i.e., foo) and each payload together with sufficient information to identify the scope of the metadata. The first SetMetadata call may have a scope of the function Bar( ), while the second SetMetadata call may have the scope of the unnamed block (e.g., the code after the first SetMetadata statement), and the third SetMetadata call may have the scope of the function Bar2( ).

The metadata returned by the API may depend on the metadata identifier and the logical element. For example, to precisely specify a specific payload, both the metadata identifier (e.g., "foo"), and the scope (e.g., Bar, unnamed block, or Bar2) may be specified.

The creation of metadata may be disabled for a program as a whole or for individual metadata calls. The following exemplary implementations are contemplated:

1. On parse. In this implementation, code has not been executed yet, but in parsing the code, the runtime may find a set metadata call, calculates the metadata based on static information included in the metadata call, and associates the metadata with logical element. Thereafter, the metadata call is stripped out, disabled, or ignored.

2. On parse plus dynamic execution. In this implementation, code has not been executed yet, but in parsing the code, the runtime finds a set metadata call, calculates the metadata based on static information included in the metadata call together with dynamic execution of code included in the metadata call, and associates the metadata with a logical element.

3. One time association. In this implementation, the first time the function is called that includes the metadata call, the metadata is computed. After the function is called, the metadata call within the function is stripped out, disabled, or ignored to improve performance.

4. Every call. In this implementation, each time the function is called that includes the metadata call, the metadata is computed.

5. Caller indicates stop. In this implementation, an API may allow a metadata call to pass a parameter that indicates that after the current metadata call succeeds (and generates metadata) that thereafter, the metadata call is stripped out, disabled, or ignored.

In one embodiment, a runtime may include logic to expand a phrase found in a function into one or more metadata calls to set metadata for a logical element. For example, a phrase such as SetAllMetadata( ) in a function may be expanded by the runtime into one or more metadata calls within the function. The phrase SetAllMetadata( ) may be defined elsewhere and may be in-lined by the runtime or another component replacing it with its defined statements prior to execution. This may be helpful, for example, where the same metadata needs to be set for multiple functions and may also help to eliminate code clutter.

In another embodiment, helper code may be referred to in a function. For example, a function may include the following code:

```
Function F1( ) {
    SetAllMetadata( );
    Statement1;
    ...
    StatementN;
}
```

The statement SetAllMetadata( ) may refer to helper code that is defined elsewhere. In executing the helper code, the runtime may walk up the stack one frame to set metadata as if set in F1 without in-lining the helper code. This technique may also be used in other functions in which the statement SetAllMetadata( ) is found.

In one embodiment, the SetMetadata call may be encoded as a comment or other code that is generally not executed. Parsers or compilers that understand the syntax of the SetMetadata comment may set attributes based on the comment while other parsers may ignore the comment. In one implementation this may be used to mark methods that are to be exposed. For example, a function may include a statement as follows:

```
Function Foo( )
{
    /* SetAttribute("ExposeToWeb", true); */
    Statement1;
    ...
    StatementN;
}
```

FIG. 2 is a block diagram that illustrates an exemplary metadata subsystem in accordance with aspects of the subject matter described herein. The metadata subsystem may include a metadata injector 205, an interface 210, a metadata manager 215, stores 220-221, and other components (not shown). The metadata subsystem may associate logical elements 225 with metadata and may store identifiers together with the metadata in the store 221. The logical elements 225 may be associated with the code in the store 220.

The metadata injector 205 represents code that may call the interface 210 and provide metadata. The metadata injector 205 may include an instruction of code that is being executed in a managed runtime environment. The code may call the metadata manager 215 through the interface 210 and may provide one or more parameters that correspond to the parameters previously mentioned. The metadata injector 205 may also include other components that provide data to the metadata manager 215. For example, the metadata injector 205 may include the managed runtime environment in which the code executes. The managed runtime environment may, for example, provide scope information to the metadata manger 215.

The interface 210 may comprise a programming interface that allows communication with the metadata manager 215.

The metadata manager 215 may comprise a component that stores metadata in the metadata store 221 and also stores associations between the metadata and the logical elements 225. For example, the metadata manager 215 may store the metadata in a memory of a managed runtime environment by setting attributes associated with the runtime. When the attributes are manipulated, the behavior of the managed runtime environment may be modified.

The metadata manager 215 may also provide metadata from the metadata store 221 to a requestor upon receiving an identifier of the metadata requested. The metadata manager 215 may call code (e.g., callback code), examine runtime state, or perform other actions as needed to calculate the metadata.

FIG. 3 is a block diagram that illustrates exemplary components that may interact with each other in accordance with aspects of the subject matter described herein. The system 300 may include a metadata provider 305, a metadata consumer 310, a context provider 315, a metadata manager 320, a store 325, and other components (not shown).

The metadata provider 305 includes any component operable to provide metadata in response to evaluating an instruction of code. Some examples of the metadata provider include: a program executing in a managed runtime environment, a software development tool, a managed runtime environment, an operating system, and the like. The metadata provider 305 may be accessed by an API by which code executing in the managed runtime environment may provide metadata and data associated with the metadata to the metadata manager 320.

At a minimum, the metadata provider 305 may provide an identifier and a payload to the metadata manager 320. The metadata provider 305 may also provide other data to the metadata manager 320 in the form of one or more parameters as has been indicated previously. In one implementation, the metadata provider 305 may explicitly provide an identifier of a logical element to the metadata manager 320.

In another implementation, the identifier of a logical element may be implicitly provided via the context provider 315. In this implementation, when the metadata provider does not explicitly provide an identifier of a logical element, the context provider 315 may determine the identifier of the logical element based on a scope of an executed instruction that calls the metadata manager 320. The context provider 315 may then pass this identifier to the metadata manager.

In addition to the identifiers above, there may be one or more other identifiers provided to the metadata manager 320. For example, a grouping identifier may be provided to the metadata manager to further qualify a payload. This grouping identifier may be used to tag metadata in addition to the identifiers described previously. For example, a function A may be called by functions B, C, D, and so forth. To create data that readily identifies when the function A was called by B and when the function A was not called by B, a grouping identifier (e.g., "ParentIsB" or "ParentIsNotB") may be provided to and stored by the metadata manager 320.

This data may then be used by the metadata consumer 310 to obtain additional helpful information. For example, a profiler may be interested in calls from B to the function A but may not be interested in calls to the function A from other functions. To obtain the data in which it is interested, the profiler may query the metadata manager 320 using the grouping identifier as a qualifier.

The metadata manager 320 is operable to receive the identifiers indicated above and a payload. The identifiers may together form lookup data that may be used to obtain the payload from the store 325. Lookup data may include the identifiers or be data that is derived (e.g., through a function) from the identifiers. The payload may include one or more of: metadata, code that when executed computes the metadata, and a reference to code that when executed computes the metadata.

The store 325 may include any storage media capable of storing metadata together with the lookup data and may be implemented in a manner similar to the implementation of the store 150 of FIG. 1.

The metadata consumer 310 is any component that requests metadata from the metadata manager 320 and may include, for example, the types of components indicated above with respect to the metadata provider 305. The metadata consumer 310 may provide one or more identifiers to the metadata manager 320 and may receive metadata in response thereto.

Figure 4:
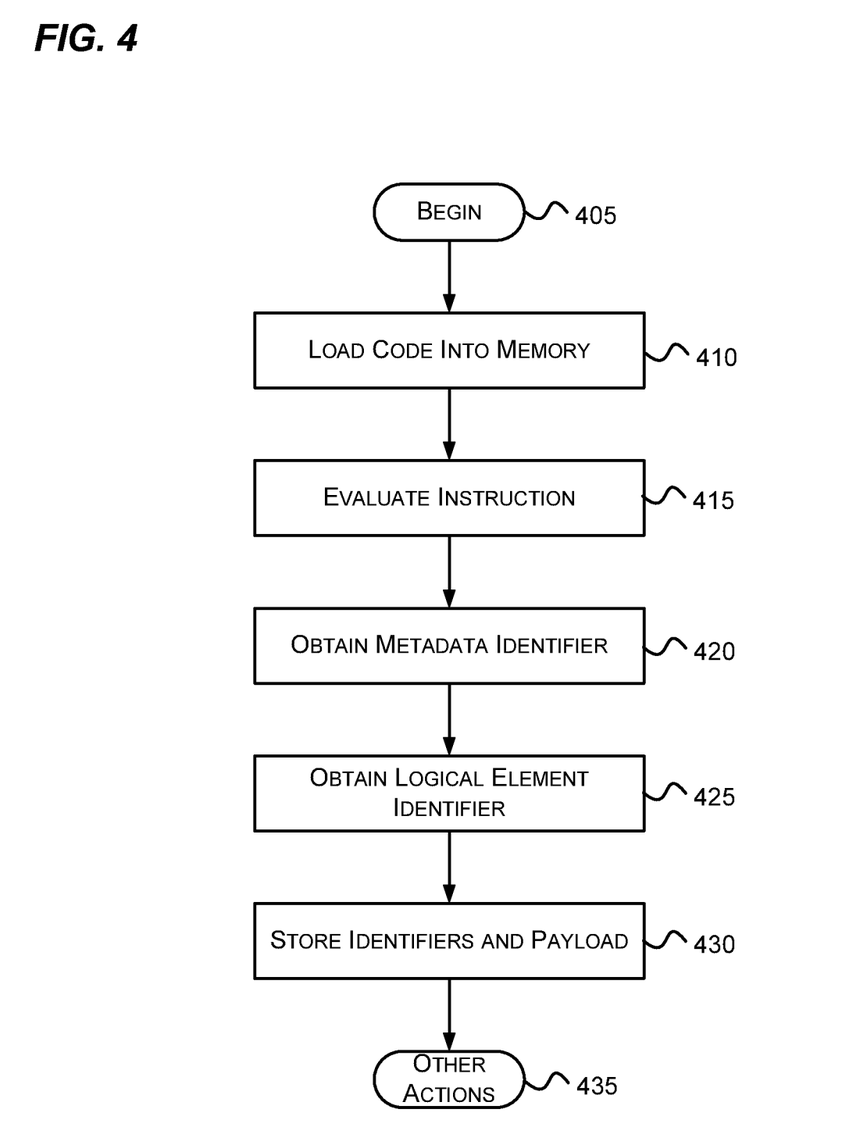
FIG. 4 is a flow diagram that generally represents exemplary actions that may occur in obtaining and storing metadata in accordance with aspects of the subject matter described herein.
Figure 5:
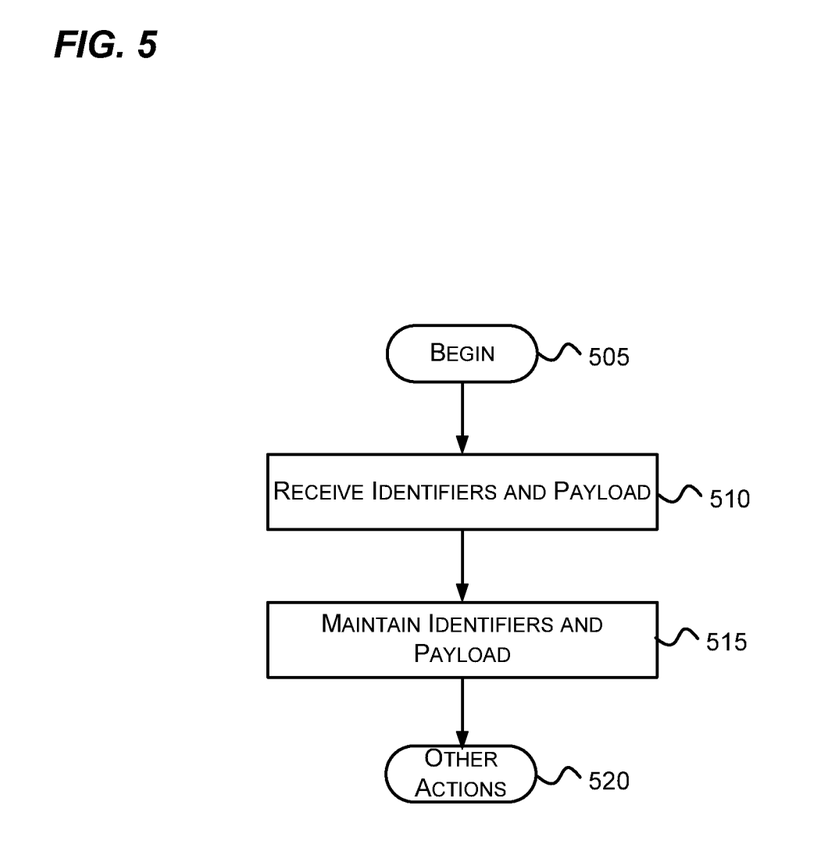
FIG. 5 is a flow diagram that generally represents exemplary actions that may occur from a metadata manager's perspective in accordance with aspects of the subject matter described herein.

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents exemplary actions that may occur in obtaining and storing metadata in accordance with aspects of the subject matter described herein. At block 405, the actions begin.

At block 410, code is loaded into a memory of a managed runtime environment. For example, referring to FIG. 1, the runtime manager 120 may load code from the store 150 into main memory in preparation for executing the code.

At block 415, an instruction of the code is evaluated. For example, referring to FIG. 105, the runtime manager 120 may evaluate an instruction of the code that was loaded into main memory. As indicated previously, the instruction may include a statement that is to be executed or may be embedded in a comment that is not normally executed.

At block 420, a metadata identifier is obtained. For example, referring to FIG. 2, the metadata manager 215 may obtain a metadata identifier from the metadata injector 205. Referring to FIG. 3, the metadata identifier may be received explicitly from the metadata provider 305 or implicitly from the context provider 315. When received from the context provider 315, this may, for example, involve determining a logical element that includes the instruction that provides the metadata identifier. Determining a logical element may, for example, include actions by the runtime including finding a topmost stack frame, creating a data structure to represent a specific call, or the like.

At block 425, a logical element identifier is obtained. For example, referring to FIG. 3, the metadata manager 320 may obtain the logical element identifier explicitly from the metadata provider 305 or implicitly from the context provider 315.

At block 430, the identifiers and the payload are stored. For example, referring to FIG. 3, the metadata manager 320 may store the metadata identifier and the logical element identifier together with the payload in the store 325.

At block 435, other actions, if any, may be performed. For example, the runtime may modify debugging, profiling, or other behavior based on the metadata. As example, other data about the metadata may be received such as, for example, an applies-to parameter, a parameter that indicates a maximum number of times the instruction is allowed to be used to set the metadata before removing the instruction from the code, a parameter that indicates a level of recursion to associate with the metadata, an indication of inheritance that indicates whether the metadata is to be inherited to children of the logical element, any other data previously mentioned, and the like.

FIG. 5 is a flow diagram that generally represents exemplary actions that may occur from a metadata manager's perspective in accordance with aspects of the subject matter described herein. At block 505, the actions begin.

At block 510, identifiers and a payload are received in response to a managed runtime environment executing an instruction of user code. For example, referring to FIG. 3, the metadata manager 320 may receive identifiers from the metadata provider 305 and the context provider 315 and may receive a payload from the metadata provider 305.

At block 515, the identifiers and payload are maintained in a store. For example, referring to FIG. 3, the metadata manager 320 may cause the identifiers and the payload to be stored in the store 325.

At block 520, other actions, if any, may be performed.

It is allowed but not required that metadata and the application of metadata be coupled together. For example, it is not required that the metadata identifier (e.g., setUserUnhandledException) indicates the nature or function of the metadata. Indeed, metadata and application of the metadata may be decoupled. Some examples of this concept are illustrated in the following code snippets:

```
function initializeAttributes( ) {
    setAttributeMetadata({ id: "functionEntered", appliesTo: "CallSite" });
    // ...
}
function profilingTargetOne( ) {
    setAttribute("functionEntered", "profilingTargetOne");
}
////
    var functionEnteredAttribute = createAttribute({ id : "functionEntered",
appliesTo : "CallSite", maxCount : 1);
    function profilingTargetTwo( ) {
        functionEnteredAttribute.fire("profilingTargetTwo")
    }
```

As can be seen from the foregoing detailed description, aspects have been described related to imperative attribution. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer having a processor and a memory coupled to the processor, the memory having program instructions stored thereon that, upon execution by the processor, cause the computer to provide a managed runtime environment, the method comprising:
    loading code into a portion of the memory allocated to the managed runtime environment;
    determining an instruction of the code by finding, via the managed runtime environment, a topmost stack frame;
    evaluating, at least in part by the processor, the instruction, the instruction indicating a first identifier and a payload, the first identifier serving as at least a portion of lookup data usable to obtain the payload, the payload including a reference to a callback function that when executed computes metadata from state available during runtime;
    obtaining, at least in part by the processor, a second identifier of a logical element to associate with the metadata, the second identifier serving as at least a portion of the lookup data;
    each time the instruction is executed to set the metadata for the first identifier, obtaining a context determined by a scope of the instruction; and
    storing the first identifier, the second identifier, the context, and the payload in the memory.

2. The method of claim 1, further comprising modifying a behavior of the managed runtime environment based on the metadata.

3. The method of claim 1, wherein obtaining a second identifier of a logical element comprises receiving the second identifier via an application programming interface.

4. The method of claim 1, wherein obtaining a second identifier of a logical element comprises determining a logical element that includes the instruction of the code.

5. The method of claim 1, further comprising receiving a grouping identifier that further qualifies the payload, and storing the grouping identifier in the memory.

6. The method of claim 1, further comprising receiving an applies-to parameter and wherein obtaining a second identifier of a logical element comprises using the applies-to parameter and a scope of the instruction to determine the logical element.

7. The method of claim 1, further comprising receiving a parameter that indicates a maximum number of times the instruction is allowed to be used to set the metadata before removing the instruction from the code.

8. The method of claim 1, further comprising receiving a parameter that indicates a level of recursion to associate with the metadata.

9. The method of claim 1, further comprising receiving data that identifies a context of the instruction and storing the data in a collection on the memory that maintains a payload and context for each instruction setting the metadata.

10. The method of claim 1, wherein evaluating an instruction of the code comprises evaluating the instruction during a parse of the code.

11. The method of claim 1, wherein evaluating an instruction of the code comprises evaluating the instruction during execution of the code.

12. A computer system, comprising:
    a processor; and
    a memory coupled to the processor, the memory configured to store program instructions that, upon execution by the processor, cause the computer system to:
        determine a logical element of the code by finding, via a managed runtime environment, a topmost stack frame;
        store a first identifier, a second identifier, and a payload, the first identifier and the second identifiers together forming lookup data usable to obtain the payload from the memory, the payload including a reference to a callback function that when executed computes metadata from state available during runtime, the second identifier identifying the logical element to associate with the metadata;
    execute instructions of a program and maintain state associated therewith;
    each time the instruction is executed to set the metadata for the first identifier, obtain a context determined by a scope of the instruction; and
    receive the first identifier and the payload from an executed instruction that is part of a program that is loaded into a memory of the managed runtime environment, and cause the first identifier, the second identifier, the context, and the payload to be stored in the memory.

13. The computer system of claim 12, wherein the context provider is configured to provide the second identifier to a metadata manager.

14. The computer system of claim 13, wherein the metadata manager is further operable to receive the second identifier from a context provider.

15. The computer system of claim 13, wherein the metadata manager is further operable to receive the second identifier as an explicit parameter indicated by the executed instruction.

16. The computer system of claim 12, further wherein the managed runtime environment is further operable to modify behavior of the managed runtime environment based on the metadata.

17. A memory device having computer-executable instructions stored thereon that, upon execution by a processor of a computer system, cause the computer system to:
- receive a first identifier, a second identifier, and a payload in response to a managed runtime environment executing an instruction of user code, wherein the instruction is determined by finding, via the managed runtime environment, a topmost stack frame, the first identifier and the second identifiers together forming lookup data usable to request the payload from an application programming interface, the payload including a reference to a callback function that when executed computes metadata from state available during runtime, the second identifier identifying a logical element to associate with the metadata;
- each time the instruction is executed to set the metadata for the first identifier, obtain a context determined by a scope of the instruction; and
- store the first identifier, the second identifier, the context, and the payload in the memory.

18. A memory device of claim 17, further comprising receiving at the application programming interface additional information including a parameter that indicates when the instruction is to be removed or disabled.

\* \* \* \* \*